United States Patent
Park et al.

(10) Patent No.: US 6,654,326 B1
(45) Date of Patent: Nov. 25, 2003

(54) AUTOMATIC TILT COMPENSATOR AND OPTICAL RECORDING/REPRODUCING APPARATUS HAVING THE SAME

(75) Inventors: Jong-Pil Park, Suwon (KR); Young-Won Lee, Suwon (KR); Young-Sun Seo, Sungnam (KR); Kyu-Hyeong Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/562,918

(22) Filed: May 2, 2000

(30) Foreign Application Priority Data

May 3, 1999 (KR) .......................................... 1999/15886
May 3, 1999 (KR) .......................................... 1999/15887

(51) Int. Cl.[7] ................................................ G11B 7/00
(52) U.S. Cl. ................................. 369/53.19; 369/44.32
(58) Field of Search ........................... 369/53.14, 53.19

(56) References Cited

U.S. PATENT DOCUMENTS

| | | |
|---|---|---|
| 4,502,134 A | 2/1985 | Kondo et al. |
| 5,107,478 A | 4/1992 | Tamaru et al. |
| 5,302,834 A | 4/1994 | Murao |
| 5,515,348 A | 5/1996 | Ohsato |
| 5,646,916 A | 7/1997 | Kobayashi |
| 5,657,303 A | 8/1997 | Namoto et al. |
| 5,708,646 A | 1/1998 | Furusawa |
| 5,764,618 A | 6/1998 | Kim |
| 5,815,480 A | 9/1998 | Seidel |
| 5,909,413 A | 6/1999 | Araki |
| 5,910,936 A | 6/1999 | Marino |
| 5,978,332 A | 11/1999 | Itakura et al. |
| 6,041,030 A | 3/2000 | Ohmi |
| 6,041,031 A | 3/2000 | Ichimura et al. |

FOREIGN PATENT DOCUMENTS

| | | |
|---|---|---|
| EP | 0 717 400 A1 | 6/1996 |
| JP | 02-094115 | 4/1990 |
| JP | 02-214024 | 8/1990 |
| JP | 06-098533 | 4/1994 |
| JP | 09-180225 | 11/1997 |
| JP | 10-083549 | 3/1998 |
| WO | WO97/50086 | 12/1997 |

*Primary Examiner*—Aristotelis M. Psitos
(74) *Attorney, Agent, or Firm*—Robert E. Bushnell, Esq.

(57) ABSTRACT

An automatic tilt compensator senses and automatically compensates for a disc deformation while an optical recording and/or reproducing apparatus operates. The automatic tilt compensator of an optical recording/reproducing apparatus has a disc deformation detecting section for sensing a deformation direction and a deformation degree of a disc seated and rotated on a disc rotation unit of a deck base and for outputting a predetermined signal, and a level adjustment section for elevating and lowering a pair of guide shafts movably supporting a pickup unit on the deck base while being operated by the signal from the disc deformation detecting section, to thereby adjust the level of the pickup unit corresponding to the deformation degree of the disc. According to this, the level of the pickup unit according to the deformation direction or the deformation degree of the disc can be automatically adjusted while the optical recording/reproducing device is operated. Accordingly, even when a deformed disc is inserted, since the level of the pickup unit is automatically adjusted according to the deformed disc, errors in recording and reproducing information caused due to the deformed disc can be remarkably reduced.

18 Claims, 10 Drawing Sheets

AUTOMATIC TILT COMPENSATOR AND OPTICAL RECORDING/REPRODUCING APPARATUS HAVING THE SAME

CLAIM OF PRIORITY

This application makes reference to, incorporates the same herein, and claims all benefits accruing under 35 U.S.C. §119 from an application entitled Automatic Tilt Adjustment Device and an Optical Recording/Reproducing Apparatus Having the Same earlier filed in the Korean Industrial Property Office on May 3, 1999, and there duly assigned Serial No. 99-15886 by that Office and an application entitled Automatic Tilt Adjustment Device and an Optical Recording/Reproducing Apparatus Having the Same earlier filed in the Korean Industrial Property Office on May 3, 1999, and there duly assigned Serial No. 99-15887 by that Office.

BACKGROUND OF THE INVENTION

1. Field of the Invention

The present invention relates to an optical recording and reproducing apparatus, and more particularly to an automatic tilt compensator and an optical recording and reproducing apparatus having the same for automatically detecting and compensating for a deformation of a disc which is rotated while the optical recording and reproducing apparatus is operated.

2. Description of the Related Art

An optical recording/reproducing apparatus is a device for recording and/or reproducing desired information on a disc by using an optical device. In such an optical recording/reproducing apparatus, a disc is seated on a turntable by a disc loading apparatus, and rotated at a predetermined speed by a rotating unit, that is, a spindle motor. While the disc is rotated, a pickup unit travels in a radial direction of the disc and radiates a laser beam on the disc, so that the pickup unit reproduces or records information.

At this time, the laser beam radiated from the pickup unit, that is, an optical axis of the laser beam is perpendicular to a surface of the disc, and the pickup unit travels while maintaining a predetermined parallel level with respect to the surface of the disc. If the pickup unit fails to maintain the predetermined level with respect to the surface of the disc, as a result, by certain external factors, that is, a disc tilt or assembly errors of the pickup unit and a feeding part of the pickup unit, a situation occurs in which information can not be reproduced or recorded on a disc. In particular, since a record pit of a Digital Versatile Disc (DVD), which has been in a great demand recently, is smaller than that of a Compact Disc (CD), the Digital Versatile Disc is sensitively responsive to a tilt of a disc.

Accordingly, in a general optical recording/reproducing apparatus, when the pickup unit fails to maintain the predetermined level with respect to a surface of a disc due to the above disc tilt, or assembly errors of the pickup unit and the like, in other words, when a tilt occurs which a laser beam of the pickup unit is not perpendicularly projected with respect to a surface of a disc, a tilt compensator, so called, is provided in the optical recording/reproducing apparatus. The tilt compensator adjusts upwards and downwards a position of the pickup unit to control the level of the pickup unit with respect to a disc.

Such a tilt compensator is structured to adjust the level of the pickup unit with respect to a disc by elevating and lowering a pair of guide shafts according to a tilt degree of the disc in which the pair of guide shafts movably support the pickup unit on a deck base. The tilt compensator of the optical recording/reproducing apparatus as stated above is, however, structured to use an arbitrary standard disc upon assembling the optical recording/reproducing apparatus and to adjust only the level of the pickup unit with respect to the standard disc. That is, during an operation of the optical recording and/or reproducing apparatus, an adjustment of the level of the pickup unit with respect to a seated disc, which is rotated for information recording or reproduction, is impossible. In fact, there is the case that the seated disc is bent upward or downward along the radial direction from its center due to a manufacturing error, etc. Accordingly, as an extreme example, if a disc loaded in the optical recording/reproducing apparatus is tilted in an opposite direction to a disc used for the adjustment of the level of the pickup unit during an assembly of the optical recording/reproducing apparatus, the gap between the disc and the pickup unit is wider or excessively more narrow than the adjusted gap. Therefore, errors upon recording/reproducing information occur, and even worse, the information recording/reproducing may not be achieved. Particularly, the above problem is more serious in the Digital Versatile Disc having a smaller pit than in the compact disc.

An exemplar of the art is Itakura et al. (U.S. Pat. No. 5,978,332, Optical Recording Medium, Tilt Detector, Optical Disk Drive, Tilt Detecting Method, and Tilt Correcting Method, Nov. 2, 1999) discloses using a tracking error signal for detecting the tilt by obtaining the difference in quantities of light received by a photo detector and correcting an error tilt amount detected by the imbalance of the light beam on a mirror surface. Ohmi (U.S. Pat. No. 6,041,030, Optical Disk Recording/Reproducing Device with Eccentric and Incline Chuck Control, Mar. 21, 2000) discloses a chuck to compensate for the tilt angle of an optical disc used for recording. Ichimura et al. (U.S. Pat. No. 6,041,031, Optical Disc Recording/Reproducing Apparatus and Method, Mar. 21, 2000) discloses an optical disc recorder and/or reproducer. Kondo et al. (U.S. Pat. No. 4,502,134, Optical Disc Signal Reproducing System with Tilt Immunization, Feb. 26, 1985) discloses a method of compensating for false tracking correction due to light reflected from the lands as opposed to the pits of a recording medium when the disc is tilted from the optical axis. Namoto et al. (U.S. Pat. No. 5,657,303, Tilt Sensor, Optical Disk, and Tilt Compensating Method for Performing a Stable Tilt Compensating Control, and Apparatus Utilizing the Same, Aug. 12, 1997) discloses a tilt sensor and a tilt compensating mechanism for angularly adjusting the optical pickup to eliminate the tilt. Araki (U.S. Pat. No. 5,909,413, Optical Pickup Apparatus Having Crosstalk Balance and Tilt Correction, Jun. 1, 1999) discloses the generation of a tilt error signal using the information about the inner and outer circumference of a track. Murao (U.S. Pat. No. 5,302,834, Optical Pickup and Tilt Control Device Including a Plurality of Photosensitive Units for Generating Signals Indicating Whether Tilt Correction is Necessary, Apr. 12, 1994) discloses a tilt control device having a parallel flat glass plate for refracting the reflected light beam from the optical system. Ohsato (U.S. Pat. No. 5,153,348, Optical Disk Pickup Device with Tilt Compensation by Electrostriction, May 7, 1996) discloses tilt compensation by electrostriction that makes a mechanical deformation cause by the application of an electric field. Marino (U.S. Pat. No. 5,910,936, Measuring and Compensating for Warp in an Optical Recording Disk, Jun. 8, 1999) discloses compensating for disk warp by calculating the desired tilts of a magnetically suspended actuator while the disk is being read. Kobayashi (U.S. Pat. No. 5,646,916, Track-Lead-In Control Device for Optical Head, Jul. 8, 1997) shows an optical head that can be used for an optical disc and Seidel (U.S. Pat. No. 5,815,480, Method for Calculating and Recording a Start Program Radius Upon a Compact Disc, Sep. 29, 1998) shows a technique for determining the start point for a compact disc recording.

SUMMARY OF THE INVENTION

The present invention is disclosed to solve the aforementioned problems, and accordingly it is an object of the present invention to provide an automatic tilt compensator of an optical recording and/or reproducing apparatus for sensing and automatically compensating for a deformation direction and a deformation degree of a disc which is rotated during an operation of the optical recording and/or reproducing apparatus.

It is another object of the present invention to provide an optical recording and/or reproducing apparatus having the automatic tilt compensator for remarkably reducing errors of information recording and/or reproducing.

It is a further object to provide an optical recording and/or reproducing apparatus for a digital versatile disc that can automatically compensate for the tilting of the device.

It is yet another object to provide a device that can provide an automatic tilt compensator that can provide for both a compact disc as well as a digital versatile disc.

It is another object to provide a device that may in a stable and a reliable manner compensate for a tilt of a recording medium in an optical recording and/or reproducing device.

The automatic tilt compensator of the optical recording and/or reproducing apparatus according to the present invention for achieving the above objects, includes a device for detecting a deformation direction and a deformation degree of a disc which is seated and rotated on a disc rotation unit of a deck base of the optical recording/reproducing apparatus, and for generating a signal; and a device for adjusting a level of a pickup unit by elevating and lowering a pair of guide shafts by which the pickup unit is movably supported on the deck base according to the signal from the deformation detecting device.

The deformation detecting device includes a sensor mounted in the pickup unit to detect a height difference between an inner and an outer circumferences of the disc, while being moved in a radial direction of the disc together with the pickup unit; and a control section for determining the deformation direction and the deformation degree of the disc by converting the height difference between the inner and the outer circumferences of the disc by the sensor into an angle, and for outputting the signal to the level adjustment device.

According to a preferred embodiment of the present invention, the level adjustment device includes a motor mounted on the deck base and driven by the signal from the deformation detecting device, to generate a driving force; a cam gear mounted on the deck base to be rotated by the motor, the cam gear having a spiral cam groove; a power transmission to reduce a rotating speed of the motor and transmit the driving force of the motor to the cam gear; and a tilt lever, mounted to be rotated in a normal (or forward) and reverse directions on a pair of hinge blocks fixed to the deck base, to elevate and lower the pair of guide shafts while being normally and reversely rotated about the hinge blocks due to the rotation of the cam gear. The tilt lever includes an actuating protrusion formed on a side thereof to be inserted into the spiral cam groove, and shaft supports provided at another side thereof and having grooves. The guide shafts being inserted into the grooves.

At this point, plate springs are mounted on the shaft supports, to prevent the guide shafts supported by the shaft supports from moving and being separated from the shaft supports during the operation of the tilt lever.

Further, set screws are provided at lower portions of the shaft supports to be in contact with the guide shafts, for manually adjusting the level of the pickup unit by elevating and lowering the guide shafts supported by the shaft supports.

According to another embodiment of the present invention, the level adjustment device includes a motor, driven by the signal from the deformation detecting device, to generate a driving force; a cam gear having a slanted face, and being rotated by the motor; a power transmission to reduce a rotation speed of the motor and transmit the driving force to the cam gear; a tilt lever, mounted to be rotated in a normal and reverse direction within a predetermined angle on the deck base by hinges, for supporting the motor, the cam gear, and the power transmission, the tilt lever having a pair of shaft supports on which grooves are formed to receive ends of the guide shafts; a protrusion fixed to the deck base, having an end being in contact with the slanted face of the cam gear; and a spring, disposed between a fixing end formed on an opposite side of the protrusion of the tilt lever and the deck base, for elastically supporting the tilt lever in one direction with respect to the hinges.

At this point, plate springs are mounted on the shaft supports, to prevent the guide shafts supported by the shaft supports from moving and being separated from the shaft supports.

Further, set screws are provided at lower portions of the shaft supports to be in contact with the guide shafts, for manually adjusting the level of the pickup unit by elevating and lowering the guide shafts supported by the shaft supports.

According to this, if a deformed disc is inserted in the optical recording/reproducing apparatus, since the level of the pickup unit is automatically adjusted according to the deformation direction and the deformation degree of the disc to record and/or reproduce information, errors in recording and/or reproducing the information according to the disc tilt can be reduced.

Further, according to another embodiment of the present invention, since the tilt compensator is constructed as a single constituent, the optical recording/reproducing apparatus can be easily assembled. The optical recording/reproducing apparatus includes a deck base; a disc rotating unit mounted on the deck base for rotating a disc loaded by a disc loading device at a predetermined speed; a pickup unit to reproduce an optical signal and to record information while being traveled in a radial direction of the disc rotated by the disc rotating unit by projecting a laser beam on the disc; a pickup unit feeding device having a pair of guide shafts to movably support the pickup unit over the deck base; a device for detecting a deformation direction and a deformation degree of the disc which is seated and rotated on the disc rotating unit, and for generating a signal; and a device for adjusting a level of a pickup unit by elevating and lowering the pair of guide shafts by which the pickup unit is movably supported by the signal from the deformation detecting means.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
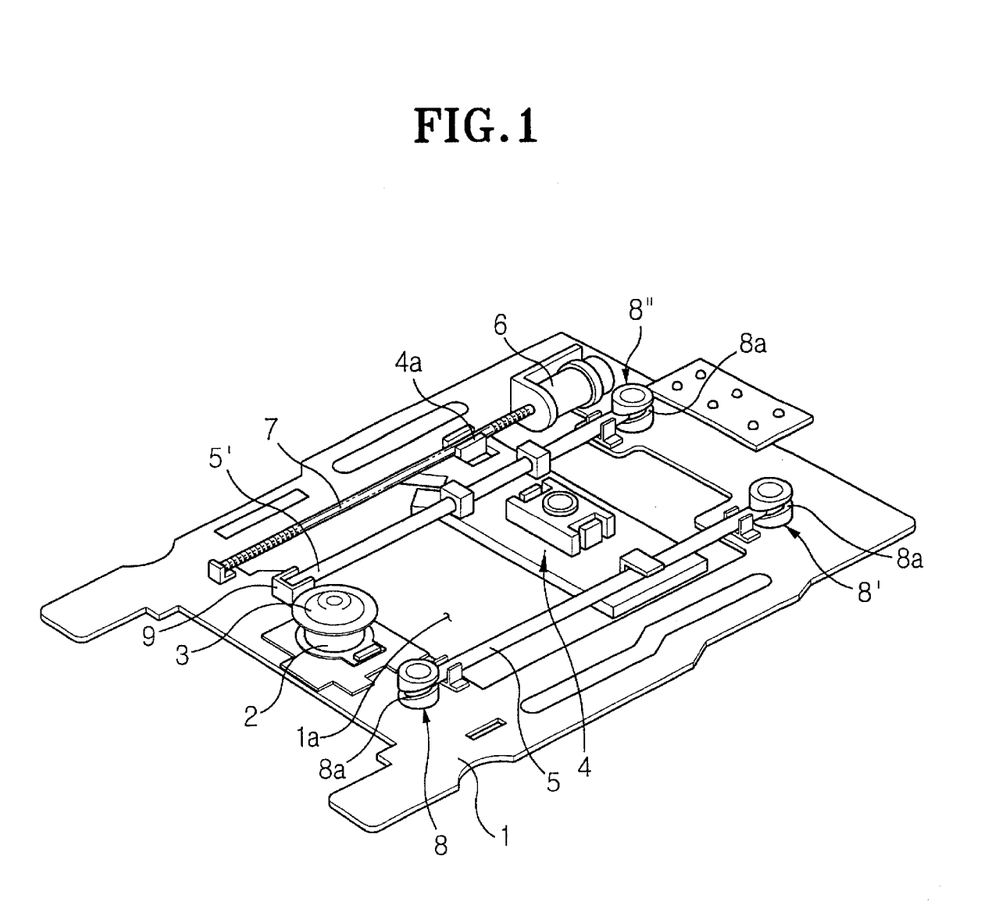
FIG. 1 is a perspective view for showing a main part of an optical recording/reproducing apparatus having a manual tilt compensator.
Figure 2:
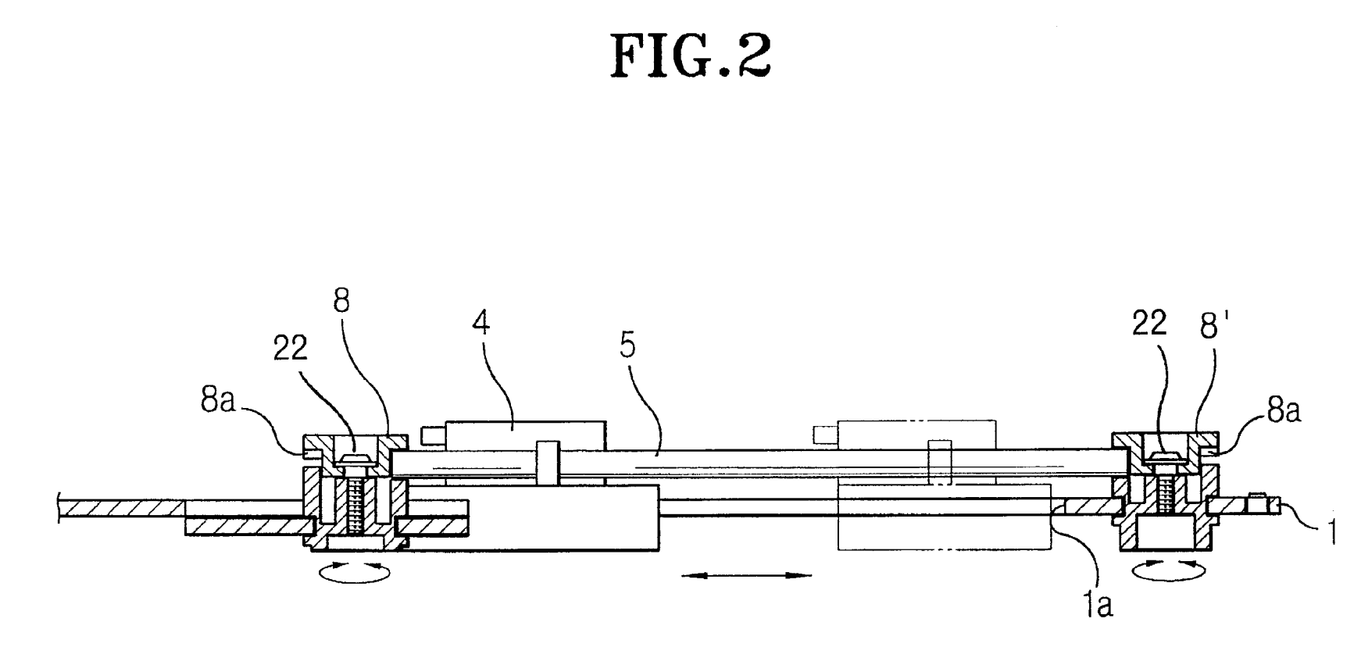
FIG. 2 is a cross-sectional view for explaining operations of the manual tilt compensator of FIG. 1.

The main parts of an optical recording/reproducing apparatus equipped with such a tilt compensator are shown in FIGS. 1 and 2 as a perspective view and a cross-sectioned view, respectively. As shown in FIGS. 1 and 2, a spindle motor 2 is mounted on the upper surface of a deck base 1, and a turntable 3 on which a disc is seated is fixed to the motor shaft of the spindle motor 2. A pickup unit 4 is movably mounted on a pair of guide shafts 5 and 5' which traverse over an opening 1a of the deck base 1 and both ends of which are respectively supported on the deck base 1. Further, a stepping motor 6 for moving the pickup unit 4 is mounted on the deck base 1, a lead screw 7 is coupled with a shaft of the stepping motor 6, and a gear part 4a is engaged with the lead screw 7 on the pickup unit 4. Accordingly, if the stepping motor 6 is driven, a driving force of the stepping motor 6 is transmitted to the pickup unit 4 through the lead screw 7 and the gear part 4a of the pickup unit 4, so that the pickup unit 4 moves along the pair of guide shafts 5 and 5'.

In the meantime, both ends of the guide shaft 5 of the pair of guide shafts 5 and 5' are respectively supported on the deck base 1 by fixing holders 8 and 8' having a spiral adjustment groove 8a, and the other guide shaft 5' are respectively supported on the deck base 1 by a fixing member 9 on one end thereof and a fixing holder 8" on the other end thereof, which has a spiral adjustment groove 8a. Here, both ends of the guide shaft 5 and one end of the guide shaft 5' are inserted in the spiral grooves 8a of the fixing holders 8, 8', and 8" respectively. Accordingly, if the fixing holders 8, 8', and 8" are rotated, the guide shafts 5 and 5' move upward and downward. A fastener 22 secures the fixing holder 8 to the deck base 1.

The tilt compensator as described above checks the level of the pickup unit with respect to a standard disc which is placed on the turn table 3 of the spindle motor 2 while the standard disc rotates. At this time, if the level of the pickup unit is not appropriate due to the tilt of the standard disc, the fixing holders 8, 8', and 8", which are connected with one end and both ends of the guide shafts 5 and 5', respectively, are selectively rotated, so that the corresponding guide shaft is elevated and lowered to adjust the level of the pickup unit 4.

FIGS. 3 to 5C are views for showing the structure and operations of an automatic tilt compensator according to an embodiment of the present invention.

Figure 3:
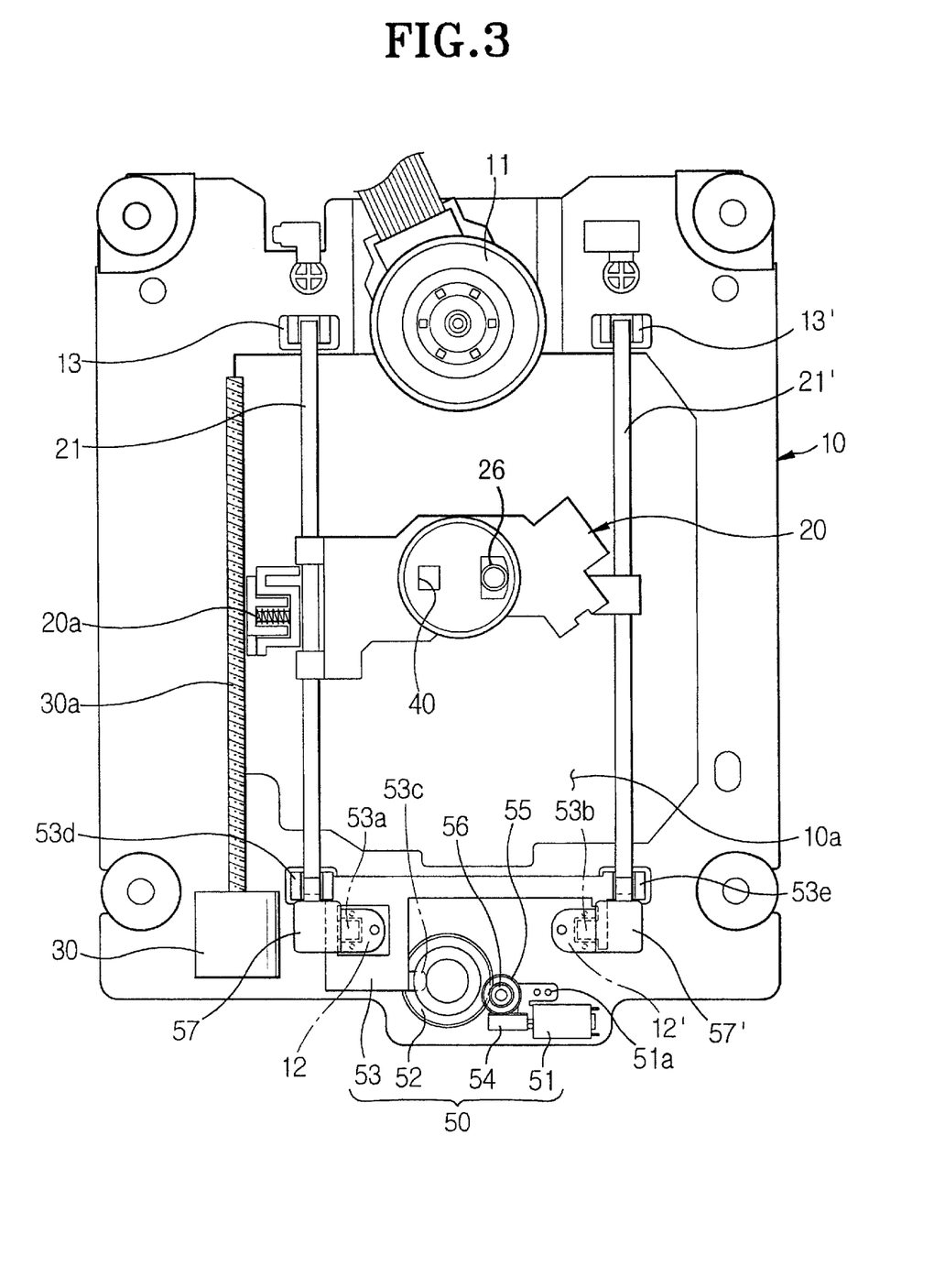
FIG. 3 is a plane view for showing a structure of an automatic tilt compensator according to an embodiment of the present invention.
Figure 4:
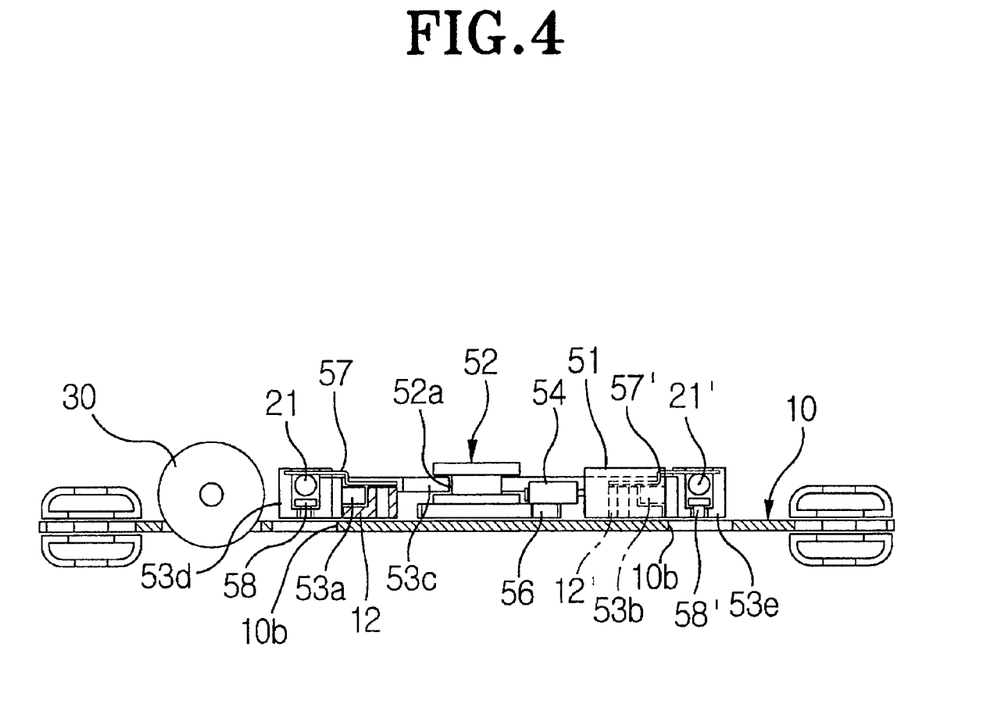
FIG. 4 is a side view of FIG. 3.

As shown in FIGS. 3 and 4, a spindle motor 11 having a turntable for seating a disc (not shown) is mounted on one side of a deck base 10. The disc is loaded by a disc loading and unloading device (not shown), seated on the turntable of the spindle motor 11, and rotated at a predetermined speed. A pickup unit 20 with an optical pickup 26 is movably mounted on a pair of guide shafts 21 and 21' which traverse over an opening 10a of the deck base 10. The pickup unit 20 projects a laser beam while traveling in the radial direction of the disc along the guide shafts 21 and 21' during the rotation of the disc.

Further, a stepping motor 30 has a lead screw 30a and is mounted on the deck base 10, and the lead screw 30a is disposed in parallel with the guide shafts 21 and 21'. A gear part 20a on the pickup unit 20 is formed to be engaged with the lead screw 30a. Accordingly, if the stepping motor 30 is driven, the driving force of the stepping motor 30 is transmitted to the pickup unit 20 through the lead screw 30a and the gear part 20a, so that the pickup unit 20 travels in the radial direction along the pair of guide shafts 21 and 21'.

A deformation detecting sensor 40 is mounted on the upper surface of the pickup unit 20, and detects in real time the deformation direction and the deformation degree (magnitude) of the disc in rotation while traveling in the radial direction of the disc together with the pickup unit 20. Further, a level adjuster 50 is mounted on the deck base 10. The level adjuster 50 is operated by a signal from the deformation detecting sensor 40 and elevates or lowers the pair of guide shafts 21 and 21' to adjust the level of the pickup unit 20 corresponding to the deformation direction and the deformation degree of the disc.

The deformation detecting sensor 40 detects the height difference in the inner and outer circumferences of a disc with respect to the standard height which is a height between a flat disc (standard disc) and the deformation sensing sensor 40, that is, a gap between the standard disc and the deformation detecting sensor 40. The height difference between the inner and outer circumferences detected by the deformation detecting sensor 40 is outputted to a control section (not shown). The control section converts the inputted height difference of the disc into the deformation angle which is outputted as an electrical signal to the level adjuster 50.

The level adjuster 50 includes a motor 21 as a driving force source, a cam gear 52 mounted on the deck base 10 to be rotated by the motor 51, and a tilt lever 53 which is rotated in a normal and reverse directions within a predetermined angle on the deck base 10 by the rotation of the cam gear 52.

The motor 51 is fixed by a motor bracket 51a on one side of the upper surface of the deck base 10, and driven by an output signal of the control section. Further, the shaft of the motor 51 is connected with a worm 54. A worm gear 55 which is engaged with the worm 54, is assembled on the deck base 10. Further, a reduction gear 56 is coaxially mounted to the worm gear 55. The reduction gear 56 is engaged with the cam gear 52. Accordingly, when the motor 51 is driven, the driving force of the motor 51 is transmitted to the cam gear 52 at a reduced rotation speed through the worm 54, the worm gear 55, and the reduction gear 56, so that the cam gear 52 is rotated. The worm 54, the worm gear 55, and the reduction gear 56 can also be collectively called a power transmission or a gear box. A spiral cam groove 52a having a predetermined slant is formed on the cam gear 52.

In the meantime, the tilt lever 53 is rotated in the normal and reverse directions within a predetermined angle with respect to a pair of hinge blocks 12 and 12' since a pair of hinge protrusions 53a and 53b formed on the opposite sides of the tilt lever 53 are inserted into the grooves of the pair of hinge blocks 12 and 12' mounted at an appropriate interval on the deck base 10. Further, on the front side of the tilt lever 53, an operation protrusion 53c is formed to be inserted into the spiral cam groove 52a of the cam gear 52, while on the rear side of the tilt lever 53, a pair of shaft supports 53d and 53e respectively having grooves for receiving end portions of the pair of guide shafts 21 and 21' are formed. Accordingly, when the cam gear 52 is rotated, the operation protrusion 53c of the tilt lever 53, which is inserted into the cam groove 52a of the cam gear 52, travels along the cam groove 52a, so that the tilt lever 53 is rotated in the normal and reverse directions at a predetermined angle with respect to the hinge blocks 12 and 12' to elevate or lower the respective ends of the pair of guide shafts 21 and 21'. Here, the opposite ends of the pair of guide shafts 21 and 21' are supported over the deck base 10 by a pair of fixing holders 13 and 13'.

Further, the pair of hinge blocks 12 and 12' are screwed and fixed to the deck base 10. End portions of plate springs 57 and 57' are fixed to the pair of hinge blocks 12 and 12', while the other end portions of the plate springs 57 and 57' are positioned over the grooves of the shaft supports 53d and 53e to press the upper portions of the guide shafts 21 and 21' which are supported by the shaft supports 53d and 53e. Therefore, the guide shafts 21 and 21' are prevented from moving or separating from the shaft supports 53d and 53e upon operation of the tilt lever 53, to thereby provide a more accurate tilt adjustment.

Further, set screws 58 and 58' are respectively mounted at lower portion of the shaft supporters 53d and 53e of the tilt lever 53 which are upwardly screwed through holes 10b formed in the deck base 10. The upper ends of the set screws 58 and 58' are in contact with lower portions of the guide shafts 21 and 21' which are supported by the shaft supports 53d and 53e. Accordingly, if the set screws 58 and 58' are screwed, the guide shafts 21 and 21' are elevated or lowered. That is, a tilt compensation may be performed by manually elevating and lowering the guide shafts 21 and 21'. Such manual tilt compensation is performed upon assembling the optical recording/reproducing apparatus.

Hereinafter, operations of an automatic tilt compensator according to this embodiment of the present invention having the above structure will be described.

Upon operation of the optical recording/reproducing apparatus, the deformation detecting sensor 40 fixed to the pickup unit 20 travels in the radial direction of the disc which is rotated, and detects the deformation direction and the deformation degree of the disc, that is, the height difference between the inner and outer circumferences.

A signal from the deformation detecting sensor 40 is outputted to the motor 51 of the level adjuster 50 through the control section, so that the motor 51 is driven.

The cam gear 52 is rotated by the driving of the motor 51, and the tilt lever 53 is rotated in the normal and reverse directions within a predetermined angle with respect to the hinge blocks 12 and 12' of the deck base 10 by the rotation of the cam gear 52. At this time, since the end portions of the guide shafts 21 and 21' are supported by the shaft supports 53d and 53e of the tilt lever 53, the guide shafts 21 and 21' are elevated and lowered according to the rotation of the tilt lever 53, to thereby adjust the level of the pickup unit 20 according to the deformation of the disc.

Figure 4A:
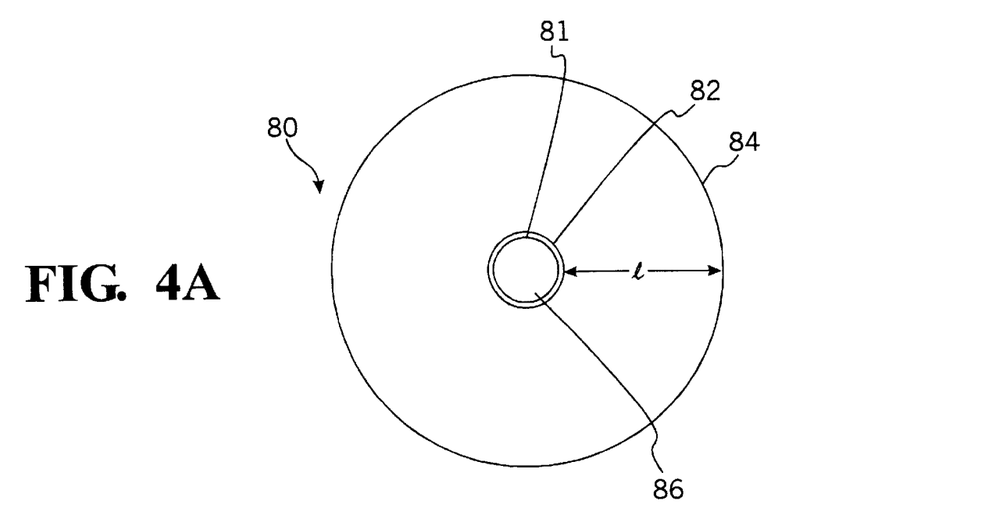
FIG. 4A is top view of an optical recording media.
Figure 4B:
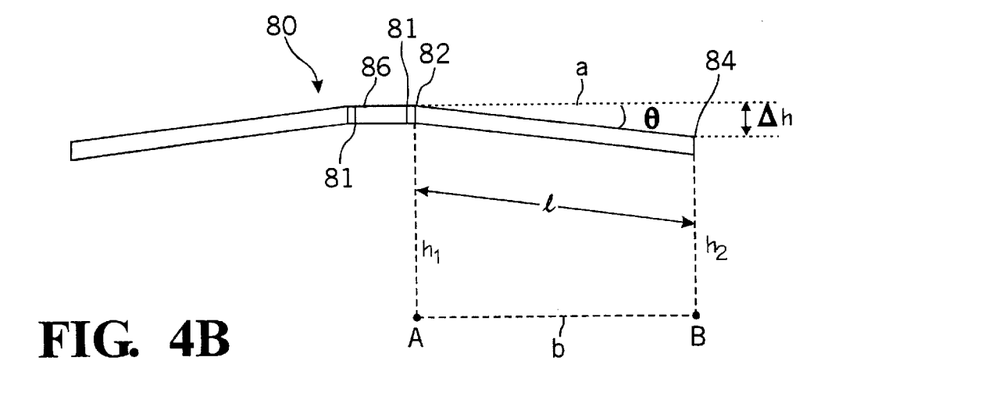
FIG. 4B is a cross section of the optical recording media of FIG. 4A showing an exaggerated example of a deformation of the media.
Figure 4C:
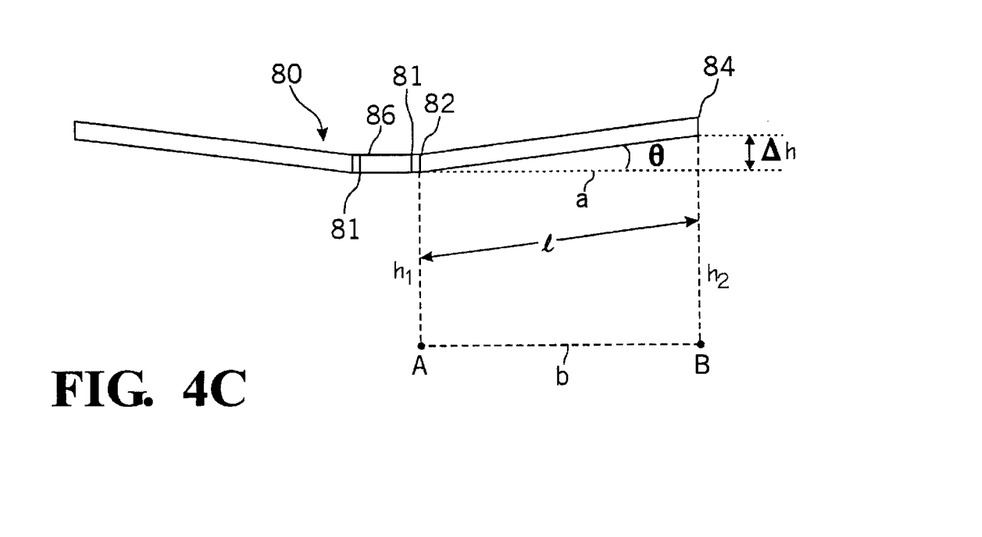
FIG. 4C is a cross section of the optical recording media of FIG. 4B showing another exaggerated example of a deformation of the media.

Referring to FIG. 4A, a recordable disc 80 is shown with an inner circumference 82 and an outer circumference 84. The inner circumference 82 refers to the area of the first data track closest to the center of the disc or around the area of the start point of the recording. The disc 80 has a circular hole 86 with a circumference 81 in the middle of the recordable disc 80. The radial distance between inner circumference 82 and outer circumference 84 is given the lengths. FIG. 4B gives an exaggerated depiction of a warp in the recordable disc 80. The exaggeration is given to show more clearly one possible example of how the deformation magnitude and direction are calculated. The deformation detecting sensor 40 can make height measurements between the deformation detecting sensor 40 and a bottom surface of the recordable disc 80. A height measurement $h_1$ is made at the inner circumference 82 when the deformation detector 40 is positioned at point A and another height measurement $h_2$ is made at the outer circumference 84 when the deformation detector 40 is positioned at point B. The deformation detector 40 moves along the line b which is the path of guide shafts 21 and 21'. An angle of the deformation $\theta$ can be calculated using the difference $\Delta h$ between the heights of the inner circumference h1 and the outer circumference h2 ($\Delta h = h_2 - h_1$). Line a is at the level of the recordable disc and is parallel with line b, where line b follows the path of the guide shafts 21 and 21'. If for example $h_1=2$ and $h_2=1$, then $\Delta h=-1$. If l=2, then using the relation of $\sin \theta = \Delta h/l$, $\theta=-30$ degrees. Therefore, the deformation of the disc 80 is 30 degrees below line a. If in FIG. 4C, $h_1=1$ and $h_2=2$, then $\Delta h=1$. If l=2, then using the relation of $\sin \theta = \Delta/l$, $\theta=+30$ degrees. The disc has a deformation of 30 degrees above the level of line a. Therefore, from the measurements of the height, the magnitude of the deformation $\Delta h$, the angle of the deformation $\theta$, and the direction of the deformation (+ or − sign of $\theta$) can be calculated.

Figure 5A:
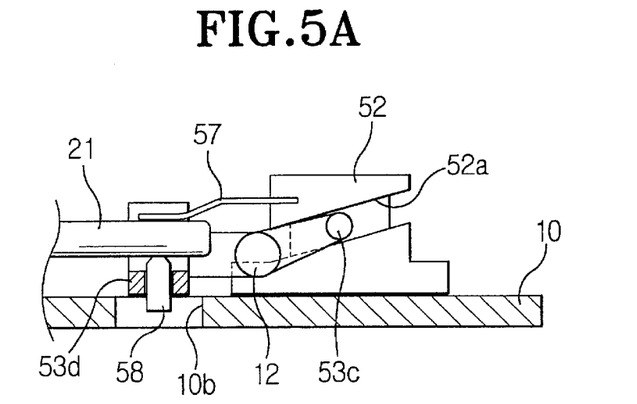
FIGS. 5A, 5B, and 5C are views for showing operations of the automatic tilt compensator according to an embodiment of the present invention, FIG. 5A for showing a guide shaft at an intermediate position, FIG. 5B for showing a guide shaft at an elevated position, and FIG. 5C for showing a guide shaft at a lowered position.
Figure 5B:
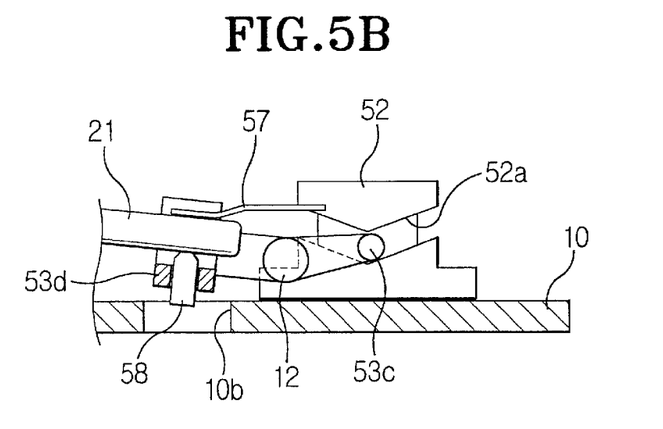
Figure 5C:
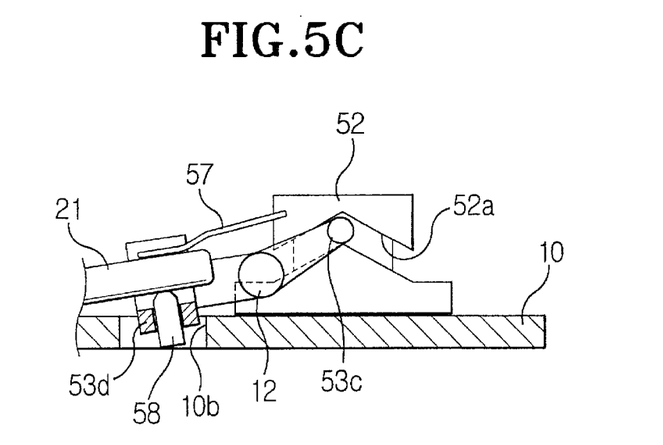
Figure 6:
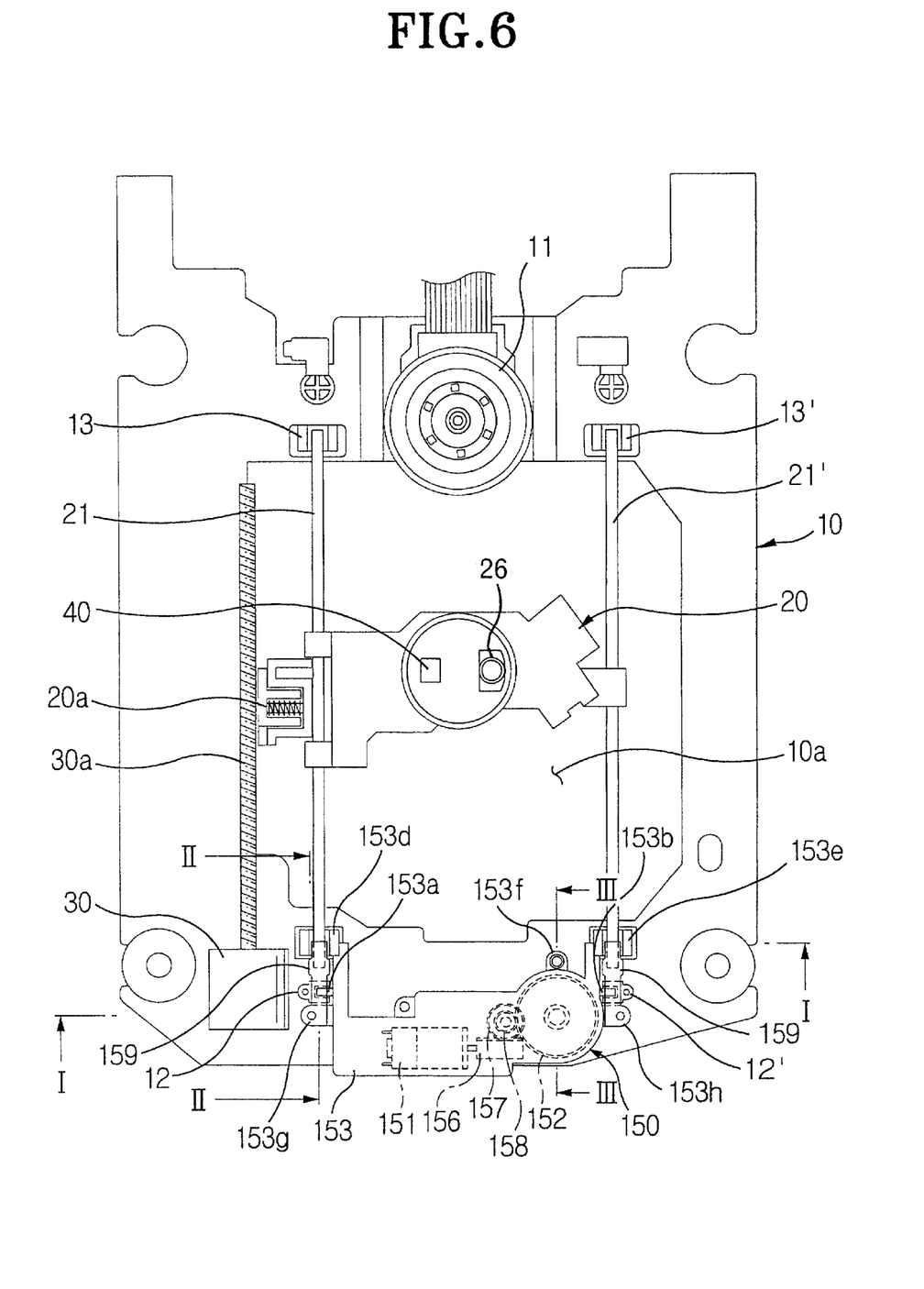
FIG. 6 is a plane view for showing a structure of an automatic tilt compensator according to another embodiment of the present invention.
Figure 7:
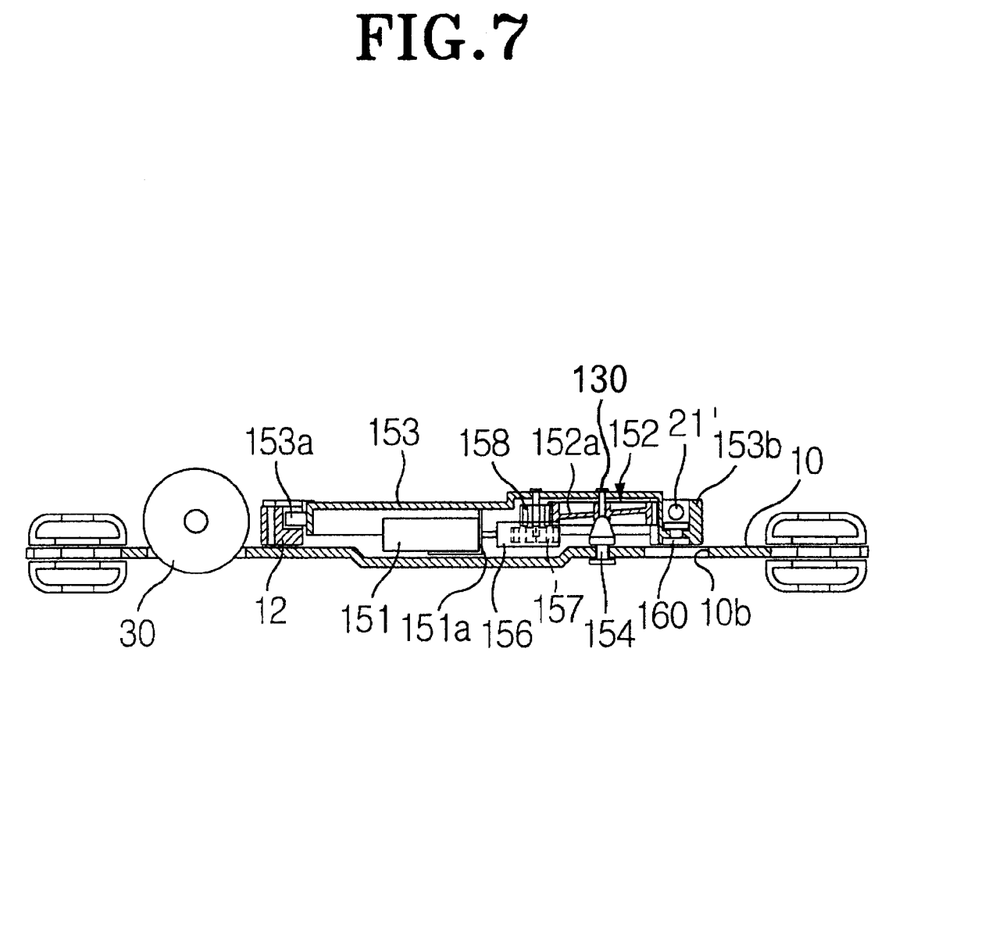
FIG. 7 is a cross-sectional view taken along line I—I of FIG. 6.
Figure 8:
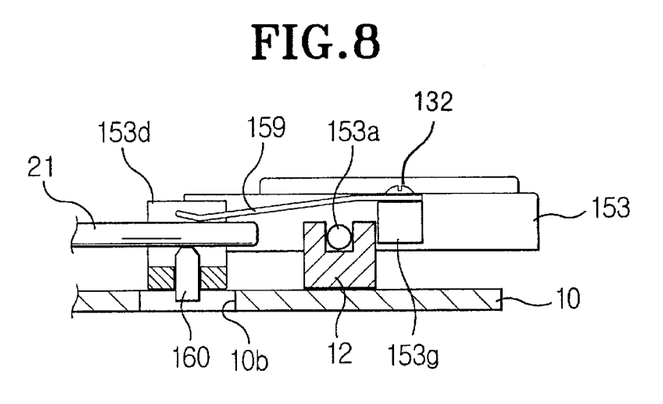
FIG. 8 is a cross-sectional view taken along line II—II of FIG. 6.

Examples of operations to elevate and lower the guide shafts 21 and 21' according to the rotation of the tilt lever 53 are shown in FIGS. 5A, 5B, and 5C.

FIG. 5A shows the operation protrusion 53c of the tilt lever 53 at an intermediate position of the cam groove 52a of the cam gear 52. In such a position, if the deformation of a disc is detected, the cam gear 52 is rotated in the normal and reverse directions as described above, so that the guide shafts 21 and 21' are elevated and lowered as shown in FIG. 5B and FIG. 5C. First, referring to FIG. 5B, the operation protrusion 53c of the tilt lever 53 is at the lowest position of the cam groove 52a of the cam gear 52. In this case, the tilt lever 53 is rotated in the clockwise direction in FIG. 5B with respect to the hinge blocks 12 and 12', so that the guide shafts 21 and 21', which are supported by the shaft supports 53*d* and 53*e* of the tilt lever 53, are elevated. Next, referring to FIG. 5C, the operation protrusion 53*c* of the tilt lever 53 is at the most upper position of the cam groove 52*a* of the cam gear 52. In this case, the tilt lever 53 is rotated in the counterclockwise direction in FIG. 5C with respect to the hinge blocks 12 and 12', so the guide shafts 21 and 21' are lowered.

By the above operations, the level of the pickup unit 20 is automatically adjusted during the operation of the optical recording/reproducing apparatus in response to the deformation direction and the deformation degree of the disc.

Accordingly, even when the deformed disc is seated on the turntable, since the level of the pickup unit is automatically adjusted according to the deformed disc while the information on the disc is recorded and/or reproduced, errors in recording/reproducing information caused due to the deformation of the disc may be remarkably reduced.

An automatic tilt compensator according to another embodiment of the present invention is shown in FIGS. 6 to 10, which will be described hereinafter. In describing this embodiment of the present invention, the same reference numerals will be given to the same constituents and operations in this embodiment of present invention as those in the previously described embodiment of the present invention, and a concrete description for the same constituents and operations will be omitted as possible, and only characteristic parts in this embodiment of the present invention will be extensively described.

As shown in FIGS. 6 to 10, an automatic tilt compensator according to another embodiment of the present invention has the same structure as that of the automatic tilt compensator according to the previously described embodiment of the present invention, with the exception that the main part, that is, the level adjuster 150 is designed as a single constituent.

More specifically, the level adjuster 150 includes a motor 151 as a driving force source; a cam gear 152 having a predetermined slanted face 152*a* and rotated by the driving of the motor 151; a power transmission (for example the worm gear 157 and the reduction gear 158) for reducing the rotation speed of the motor 151 and transmitting the driving force of the motor 151 to the cam gear 152; a tilt lever 153 for supporting the motor 151, the cam gear 152, and the power transmission mounted on the deck base 10 to be rotated in a normal and reverse directions within a predetermined angle, and having on opposite sides of the rear side thereof a pair of shaft supports 153*d* and 153*e* which have grooves for receiving end portions of the guide shafts 21 and 21'; a protrusion 154 mounted on the deck base 10 in order for the upper end portion thereof to be in contact with the slanted face 152*a* of the cam gear 152; and a spring 155 disposed between the deck base 10 and a fixing portion 153*f* formed on the opposite side of the protrusion 154 of the tilt lever 153, and for elastically supporting the tilt lever 153 in one direction with respect to the hinge blocks 12 and 12'.

The motor 151 is mounted and fixed to the inner side of the tilt lever 153 by a bracket 151*a*, and the cam gear 152 is rotatably mounted on the tilt lever 153. A worm 156 is connected to the shaft of the motor 151. The worm 156 is engaged with a worm gear 157 which is disposed on the tilt lever 153, while the worm gear 157 is coaxially connected to a reduction gear 158 which is also disposed on the tilt lever 153 to be engaged with the cam gear 152.

The tilt lever 153 is mounted to be rotated in the normal and reverse directions within a predetermined angle with respect to the hinge blocks 12 and 12' as a pair of hinge protrusions 153*a* and 153*b*, which are formed on the opposite sides of the tilt lever 153, are inserted into the grooves of the pair of hinge blocks 12 and 12' mounted on the deck base 10. Accordingly, when the motor 151 is driven, the cam gear 152 is rotated. Since the upper end portion of the protrusion 154 fixed to the deck base 10 is in contact with the slanted face 152*a* of the cam gear 152, the tilt lever 153 is rotated in the normal and reverse directions on the deck base 10 within a predetermined angle with respect to the hinge blocks 12 and 12' according to the rotation of the cam gear 152. At this time, since the respective end portions of the pair of guide shafts 21 and 21' are supported by the shaft supports 153*d* and 153*e* of the tilt lever 153 which is rotated as above, the guide shafts 21 and 21'are elevated and lowered according to the rotation of the tilt lever 153. The opposite end portions of the pair of guide shafts 21 and 21' are supported on the deck base 10 by the pair of fixing holders 13 and 13'.

Figure 9:
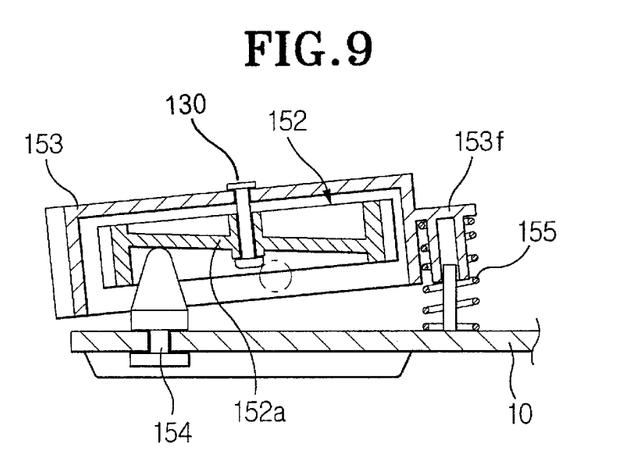
FIG. 9 is a cross-sectional view taken along line III—III of FIG. 6.
Figure 10:
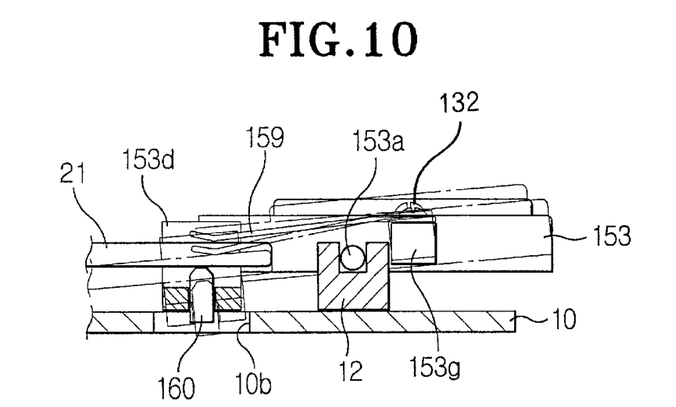
FIG. 10 is a cross-sectional view of a main part for showing operations of an automatic tilt compensator according to another embodiment of the present invention.

Referring to FIG. 9, the spring 155, which is disposed between the fixing portion 153*f* of the tilt lever 153 and the deck base 10, elastically supports the tilt lever 153 in one direction with respect to the hinge blocks 12 and 12', more specifically toward the protrusion 154 mounted on the deck base 10. Therefore, the cone shaped protrusion 154 comes in close contact with the slanted face 152*a* of the cam gear 152, so that no gap between the cam gear 152 and the protrusion 154 will occur. The cam gear 152 is held in place by a shaft 130. Referring to FIG. 10, a pair of second fixing portions 153*g* and 153*h* are formed on the tilt lever 153. End portions of plate springs 159 are fixed by fasteners 132 to the second fixing portions 153*g* and 153*h*, respectively, while the opposite end portions of the plate springs 159 are positioned on the grooves of the shaft supports 153*d* and 153*e* to push the upper portions of the guide shafts 21 and 21' which are supported by the shaft supports 153*d* and 153*e*. Therefore, the guide shafts 21 and 21' may not move or be separated from the shaft supports 153*d* and 153*e* during an operation of the tilt lever 153, so that more accurate tilt adjustments can be made.

Further, set screws 160 are upwardly screwed, respectively, on the lower portion of the shaft supports 153*d* and 153*e* of the tilt lever 153 through holes 10*b* formed on the deck base 10. The upper end portions of the set screws 160 are in contact with lower portions of the guide shafts 21 and 21' which are supported by the shaft supports 153*d* and 153*e*. Thus, if the set screws 160 are screwed, the guide shafts 21 and 21' are elevated or lowered, accordingly. That is, a tilt compensation is performed while manually lowering and elevating the guide shafts 21 and 21'.

In the automatic tilt compensator according to another embodiment of the present invention as stated above, a motor 151 is driven by a signal from the control section, the cam gear 152 is rotated by a predetermined driving force transmission process, and the tilt lever 153 is rotated in the normal and reverse directions within a predetermined angle with respect to the hinge blocks 12 and 12' of the deck base 10. At this time, since the end portions of the guide shafts 21 and 21' are supported by the shaft supports 153*d* and 153*e* of the tilt lever 153, the guide shafts 21 and 21' are elevated or lowered according to the rotation of the tilt lever 153. As a result, since the pickup unit 20 is movably supported by the guide shafts 21 and 21', the level of the pickup unit 20 is adjusted according to the disc deformation.

Accordingly, even when a deformed disc is seated on the turntable, since information is recorded and/or reproduced while the level of the pickup unit according to the deformed disc is automatically adjusted, errors in recording/reproducing the information which are caused due to the deformation of a disc may be remarkably reduced.

Figure 11:
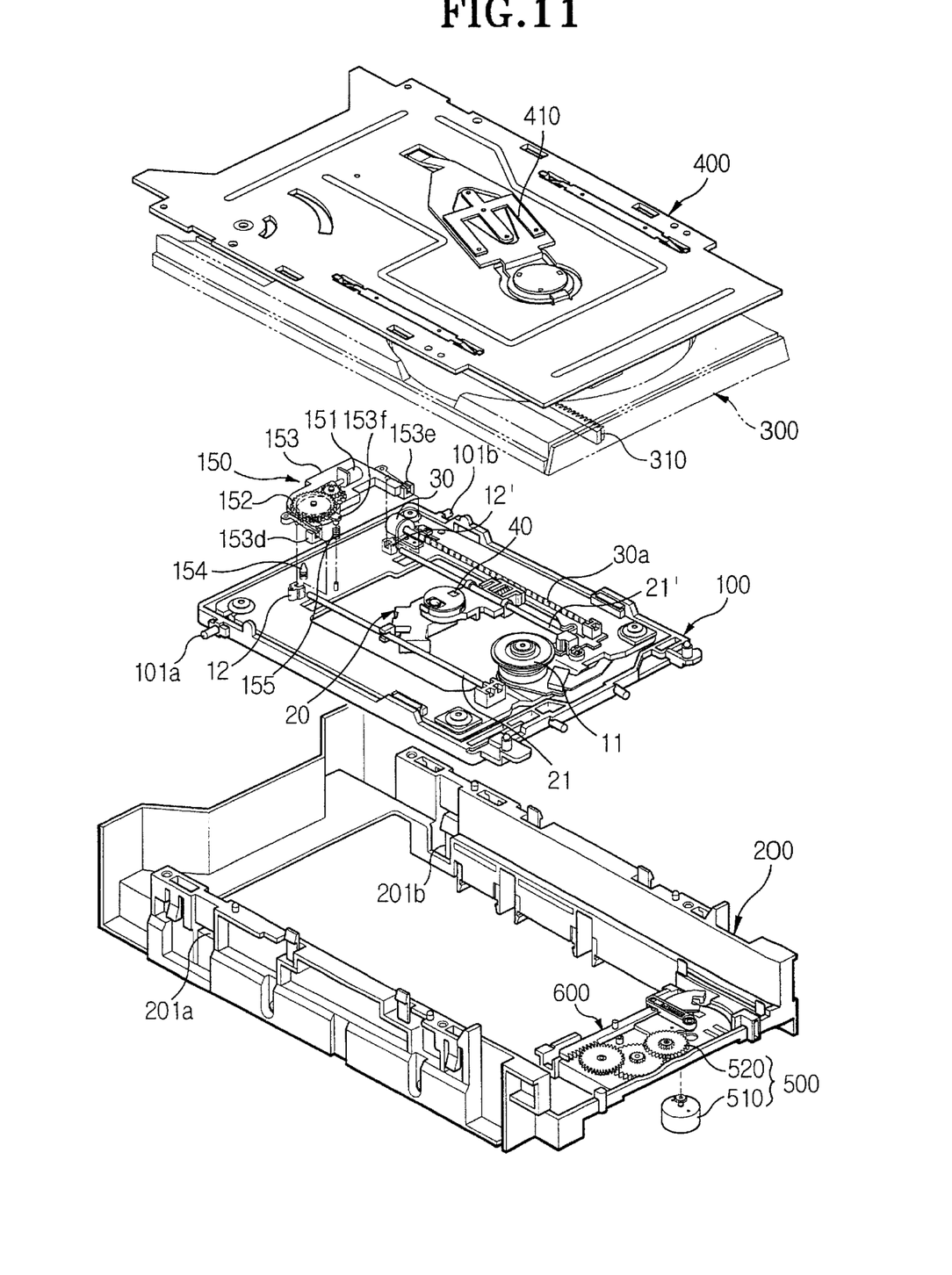
FIG. 11 is an exploded perspective view for showing an optical recording/reproducing apparatus having an automatic tilt compensator according to the present invention.

Referring to FIG. 11, an optical recording/reproducing apparatus has an automatic tilt compensator according to another embodiment of the present invention. Since the level adjuster for the automatic tilt compensator is designed as a single constituent, it can be easily assembled. Although the automatic tilt compensator as a single constituent is depicted herein in FIGS. 6 to 10, the automatic tilt compensator of the previously described embodiment shown in FIGS. 3 to 5 may be also employed.

As shown in FIG. 11, a deck base assembly 100 is movably mounted on a main body case 200 by inserting a pair of hinge protrusions 101a and 101b formed on opposite sides of the rear end of the deck base assembly 100 into grooves 201a and 201b of the main body case 200, respectively. Since the deck base assembly 100 has the same structure as that shown in FIG. 6, which is described above, the same reference numerals are applied to the same constituents, and a detailed description for the same constituents will be omitted. Further, the same reference numerals are applied to the same constituents and a detailed description for the same constituents will be omitted for the automatic tilt compensator which is the main part of the present invention structured in the deck base assembly 100.

The main body case 200 includes a tray insertion/ejection unit 500 having a loading motor 510 for loading a tray 300 mounted to move into and out of the main body case 200; and a deck base up/down unit 600 for moving the deck base assembly 100 upward and downward while being operated according to the movement of the tray insertion/ejection unit 500.

Further, a rack gear 310, which is engaged with a gear train 520 of the tray insertion/ejection unit 500, is formed on the lower surface of the tray 300, and a clamp assembly 410 is mounted on an upper cover 400 to press the hub portion of a disc according to the insertion and ejection operations of the tray 300.

A disc is seated on the tray 300 which is ejected from the main body case 200. If the tray 300 is manually pushed or operated by pressing a separate loading switch, a loading motor 510 of the tray insertion/ejection unit 500 is driven, and the tray 300 starts to be inserted into the main body case 200.

As the tray 300 is inserted, the deck base assembly 100 is elevated up to the disc loading position by the deck base up/down unit 600 which is operated by the operation of the tray insertion/ejection unit 500. Then, upon complete insertion of the tray 300, the disc in the tray 300 is seated on the turntable which is fixed to the spindle motor 11 of the deck base assembly 100 and chucked by the clamp assembly 410.

The disc is rotated at a predetermined speed by the spindle motor 11, and the pickup unit 20 travels in the radial direction of the rotating disc on which a laser beam is projected for recording and/or reproducing information. At the same time, the deformation detecting sensor 40 of the pickup unit 20 travels together with the pickup unit 20, senses the deformation direction and the deformation degree of the disc, and outputs a signal to the level adjuster 150 of the automatic tilt compensator.

Accordingly, the motor 151 of the level adjuster 150 is driven, and the cam gear 152 is rotated by the driving of the motor 151. By the rotation of the cam gear 152, the tilt lever 153 is rotated in the normal and reverse directions within a predetermined angle with respect to the hinge blocks 12 and 12' of the deck base 10 to elevate and lower the guide shafts 21 and 21', to thereby adjust the level of the pickup unit according to the deformation of a disc for a tilt compensation. That is, the optical recording/reproducing apparatus of the present invention records and reproduces information while automatically performing a disc tilt compensation. Accordingly, errors in recording and/or reproducing information due to the disc deformation can be remarkably reduced. For this reason, the present invention can be adapted to the optical disc driver for a digital video disc which is very much in demand these days.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An automatic tilt compensator of an optical recording and reproducing apparatus, comprising:

means for detecting a deformation direction and a deformation magnitude of a disc which is seated and rotated on a disc rotation unit of a base of the optical recording and reproducing apparatus, and for generating a signal: and means for automatically adjusting a level of a pickup unit by elevating and lowering a pair of first shafts by which the pickup unit is movably supported and guided on the base according to the signal from said deformation detecting means, wherein said deformation detecting means comprises:

a sensor mounted in the pickup unit to detect a height difference between an inner circumference and an outer circumference of the disc, while being moved in a radial direction of the disc together with the pickup unit; and a control section determining the deformation direction and the deformation magnitude of the disc by converting the height difference between the inner and the outer circumferences of the disc by the sensor into an angle, and outputting the signal to the level adjustment means.

2. An automatic tilt compensator of an optical recording and reproducing apparatus, comprising:

means for detecting a deformation direction and a deformation magnitude of a disc which is seated and rotated on a disc rotation unit of a base of the optical recording and reproducing apparatus, and for generating a signal; and means for automatically adjusting a level of a pickup unit by elevating and lowering a pair of first shafts by which the pickup unit is movably supported and guided on the base according to the signal from said deformation detecting means, wherein the level adjustment means comprises:

a motor, mounted on the base and driven by the signal from the deformation detecting means, to generate a driving force;

a cam gear mounted on the base to be rotated by said motor, said cam gear having a spiral cam groove;

a power transmission to reduce a rotating speed of said motor and transmit the driving force of said motor to said cam gear; and a lever, mounted on a pair of hinge blocks fixed to the base to be rotated in forward and reverse directions, to elevate in a tilt position and lower the pair of first shafts while being rotated in a forward and reverse direction about the hinge blocks due to the rotation of said cam gear, said lever including a protrusion formed on a side of said lever to be inserted into the spiral cam groove, and support members provided at another side of said lever and having grooves, the first shafts being inserted into the grooves of the support members.

3. The automatic tilt compensator claimed in claim 2, further comprising resilient members mounted on the shaft supports, to prevent the first shafts supported by the shaft supports from moving and being separated from the shaft supports during the operation of said lever.

4. The automatic tilt compensator claimed in claim 2, further comprising fasteners accommodating manual adjustment of the level of the pickup unit by elevating and lowering the first shafts supported by the shaft supports, said fasteners being provided at lower portions of the shaft supports to be in contact with the first shafts.

5. An automatic tilt compensator of an optical recording and reproducing apparatus, comprising:

means for detecting a deformation direction and a deformation magnitude of a disc which is seated and rotated on a disc rotation unit of a base of the optical recording and reproducing apparatus, and for generating a signal; and means for automatically adjusting a level of a pickup unit by elevating and lowering a pair of first shafts by which the pickup unit is movably supported and guided on the base according to the signal from said deformation detecting means, wherein the level adjustment means comprises:
      a motor, driven by the signal from the deformation detecting means, to generate a driving force;
      a cam gear having a slanted face, and being rotated by the motor;
      a power transmission to reduce a rotation speed of the motor and transmit the driving force to the cam gear;
      a lever, mounted to be rotated in a normal and reverse direction within a predetermined angle on the base by hinges, supporting the motor, the cam gear, and the power transmission, said lever having a pair of shaft supports on which grooves are formed to receive ends of the first shafts;
      a protrusion fixed to the base, having an end being in contact with the slanted face of the cam gear; and
      a first resilient member, disposed between a fixing end formed on an opposite side of said protrusion of said lever and the base, elastically supporting the lever in one direction with respect to the hinges.

6. The automatic tilt compensator claimed in claim 5, further comprising second resilient members mounted on the shaft supports, to prevent the first shafts supported by the shaft supports from moving and being separated from the shaft supports.

7. The automatic tilt compensator claimed in claim 5, further comprising setscrews accommodating manual adjustment of the level of the pickup unit by elevating and lowering the first shafts supported by the shaft supports, the set screws being provided at lower portions of the shaft supports to be in contact with the first shafts.

8. An apparatus for adjusting a tilt of a pickup unit, comprising:

said pickup unit mounted below a memory media having a disc shape being seated and rotated on a first unit mounted on a base of said apparatus;

a sensor, mounted on said pickup unit, detecting a height difference of inner and outer circumferences of the memory media while traveling in a radial direction of the memory media together with said pickup unit;

a control section determining the deformation direction and the deformation magnitude of the memory media by converting the height difference of the inner and outer circumferences of the memory media into an angle by the sensor, and outputting a signal corresponding to the determined results;

a motor, mounted on the base and driven by the signal from said control section, to generate a driving force;

a cam gear mounted on the base to be rotated by the motor, said cam gear having a spiral cam groove;

a power transmission to reduce a rotating speed of the motor and transmit the driving force of the motor to said cam gear;

a lever, mounted to be rotated in a forward and reverse directions on a pair of blocks fixed to the base, to elevate to a tilt position and lower the pair of guide shafts while being rotated in a forward and reverse direction about the blocks due to the rotation of the cam gear, the lever including an actuating protrusion formed on a side thereof to be inserted into the spiral cam groove, and shaft supports provided at another side thereof and having grooves, wherein the guide shafts being inserted into the grooves;

plate springs, mounted on the shaft supports, for preventing the guide shafts supported by the shaft supports from moving and being separated from the shaft supports during the operation of said lever; and setscrews manually adjusting the tilt of said lever, installed at lower portions of the shaft supports of said lever, and provided with an end being in contact with lower portions of the guide shafts supported by the shaft supports.

9. An apparatus for adjusting a level of a pickup unit, comprising:

a sensor mounted on the pickup unit, sensing a height difference of inner and outer circumferences of a disc while traveling in a radial direction of the disc together with the pickup unit;

a control section determining the deformation direction and the deformation degree of the disc by converting the height difference of the inner and outer circumferences of the disc into an angle by the sensor, and for outputting a signal corresponding to the determined results;

a motor driven by the signal from said control section, generating a driving force;

a cam gear having a predetermined slanted face, being rotated by said motor;

a power transmission reducing a rotation speed of said motor and transmitting a driving force to said cam gear;

a tilt lever, mounted to be rotated in a normal and reverse direction within a predetermined angle on a base by hinges, supporting said motor, said cam gear, and said power transmission, the tilt lever having a pair of shaft supports on which grooves are formed to receive ends of the guide shafts;

a protrusion fixed to the base, having an end being in contact with the slanted face of said cam gear;

a spring, disposed between a fixing end formed on an opposite side of the protrusion of said tilt lever and the base, elastically supporting said tilt lever in one direction with respect to the hinges;

plate springs, mounted on the shaft supports, preventing the guide shafts supported by the shaft supports from moving and being separated from the shaft supports during the operation of said tilt lever; and set screws manually adjusting a tilt of said pickup unit installed at lower portions of the shaft supports of the tilt lever, and provided with an end being in contact with lower portions of the guide shafts supported by the shaft supports.

10. An optical recording or reproducing apparatus comprising:

a deck base;

a disc rotating unit mounted on the deck base rotating a disc loaded by a disc loading device at a predetermined speed;

a pickup unit to reproduce an optical signal and to record information while being traveled in a radial direction of the disc rotated by the disc rotating unit by projecting a laser beam on the disc;

a pickup unit feeding device having a pair of guide shafts to movably support the pickup unit over the deck base;

means for detecting a deformation direction and a deformation degree of the disc which is seated and rotated on the disc rotating unit, and for generating a signal; and means for adjusting a level of a pickup unit by elevating and lowering the pair of guide shafts by which the pickup unit is movably supported by the signal from the deformation detecting means, wherein the deformation detecting means comprises:

a sensor mounted in the pickup unit to detect a height difference between an inner and an outer circumferences of the disc, while being moved in a radial direction of the disc together with the pickup unit; and a control section for determining the deformation direction and the deformation degree of the disc by converting the height difference between the inner and the outer circumferences of the disc by the sensor into an angle, and for outputting the signal to the level adjustment means.

11. The optical recording or reproducing apparatus as claimed in claim 10, wherein the level adjustment means comprises:

a motor, mounted on the deck base and driven by the signal from the deformation detecting means, to generate a driving force;

a cam gear mounted on the deck base to be rotated by the motor, the cam gear having a spiral cam groove;

a power transmission to reduce a rotating speed of the motor and transmit the driving force of the motor to the cam gear; and a tilt lever, mounted to be rotated in a forward and reverse directions on a pair of hinge blocks fixed to the deck base, to elevate and lower the pair of guide shafts while being forwardly and reversely rotated about the hinge blocks due to the rotation of the cam gear, the tilt lever including an actuating protrusion formed on a side thereof to be inserted into the spiral cam groove, and shaft supports provided at another sides thereof and having grooves, wherein the guide shafts being inserted into the grooves.

12. The optical recording or reproducing apparatus as claimed in claim 11, further comprising plate springs, mounted on the shaft supports, to prevent the guide shafts supported by the shaft supports from moving and being separated from the shaft supports during the operation of the tilt lever.

13. The optical recording or reproducing apparatus as claimed in claim 11, further comprising set screws for manually adjusting the level of the pickup unit by elevating and lowering the guide shafts supported by the shaft supports, the set screws being provided at lower portions of the shaft supports to be in contact with the guide shafts.

14. The optical recording or reproducing apparatus as claimed in claim 10, wherein the level adjustment means comprises:

a motor, driven by the signal from the control section, to generate a driving force;

a cam gear having a slanted face, and being rotated by the motor;

a power transmission to reduce a rotation speed of the motor and transmit the driving force to the cam gear;

a tilt lever, mounted to be rotated in a forward and reverse direction within a predetermined angle on the deck base by hinges, for supporting the motor, the cam gear, and the power transmission, the tilt lever having a pair of shaft supports on which grooves are formed to receive ends of the guide shafts;

a protrusion fixed to the deck base, having an end being in contact with the slanted face of the cam gear; and a spring, disposed between a fixing end formed on an opposite side of the protrusion of the tilt lever and the deck base, for elastically supporting the tilt lever in one direction with respect to the hinges.

15. The optical recording or reproducing apparatus as claimed in claim 14, further comprising plate springs, mounted on the shaft supports, to prevent the guide shafts supported by the shaft supports from moving and being separated from the shaft supports during the operation of the tilt lever.

16. The optical recording or reproducing apparatus as claimed in claim 14, further comprising set screws for manually adjusting the level of the pickup unit by elevating and lowering the guide shafts supported by the shaft supports, the set screws being provided at lower portions of the shaft supports to be in contact with the guide shafts.

17. A method, comprising the steps of:

mounting a sensor in a pickup unit of an optical recording device accommodating a recordable disc to detect a height difference between an inner circumference and an outer circumference of the disc, while being moved in a radial direction of the disc together with said pickup unit;

installing a control section determining the deformation direction and the deformation magnitude of said disc by converting the height difference between the inner and the outer circumferences of said disc by the sensor into an angle, and outputting a signal;

mounting a motor on a base of said optical recording device and driven by said signal from said control section, to generate a driving force;

mounting a cam gear on said base to be rotated by said motor, said cam gear having a spiral cam groove;

installing a power transmission to reduce a rotating speed of said motor and transmit the driving force of said motor to said cam gear; and mounting a lever on a pair of hinge blocks fixed to said base to be rotated in forward and reverse directions, to elevate in a tilt position and lower a pair of first shafts while being rotated in a forward and reverse direction about the hinge blocks due to the rotation of said cam gear, said lever including a protrusion formed on a side of said lever to be inserted into the spiral cam groove, and support members provided at another side of said lever and having grooves, said first shafts being inserted into the grooves of said support members, said first shafts movably supporting said pickup unit on said base.

18. The method of claim 17, further comprising the steps of:

mounting resilient members on said shaft supports, to prevent said first shafts supported by said shaft supports from moving and being separated from said shaft supports during the operation of said lever; and inserting fasteners accommodating manual adjustment of the level of said pickup unit by elevating and lowering said first shafts supported by said shaft supports, said fasteners being provided at lower portions of said shaft supports to be in contact with said first shafts.

\* \* \* \* \*